No. 613,253. Patented Nov. 1, 1898.
S. A. DAVIS.
GEAR INDICATING DEVICE.
(Application filed Oct. 7, 1897.)
(No Model.)

Witnesses.

Inventor.
Stephen A. Davis.
By James L. Norris.
Att'y.

UNITED STATES PATENT OFFICE.

STEPHON A. DAVIS, OF CHICAGO, ILLINOIS.

GEAR-INDICATING DEVICE.

SPECIFICATION forming part of Letters Patent No. 613,253, dated November 1, 1898.

Application filed October 7, 1897. Serial No. 654,422. (No model.)

*To all whom it may concern:*

Be it known that I, STEPHON A. DAVIS, a citizen of the United States, residing at Chicago, in the county of Cook and State of Illinois, have invented new and useful Improvements in Gear-Indicating Devices, of which the following is a specification.

This invention relates to gear-indicating devices, and has for its special object to provide an indicator comprising a table or tables of appropriate figures or characters and a plurality of conjointly movable arms arranged to be operated in unison, so that by the position of said arms with relation to the figures, numbers, or characters on the table or tables there will be at once indicated the required number of teeth for front and rear sprocket-wheels of a cycle-gearing to give the desired gear for a driving-wheel of any known diameter, or, conversely, to indicate the gear that corresponds with the diameter of the wheel and number of teeth on the front and rear sprockets. The table or tables may be further arranged to show the distance traveled by the driving-wheel in one revolution of the pedal, according to the gear of the wheel.

The invention consists in the combination of conjointly-movable indicator-arms with appropriately-arranged columns or lines of figures or numbers in one or more tables for indicating the gear of cycles and the distance traveled by the driving-wheel in each revolution of the pedal, as hereinafter more particularly set forth.

Figure 1:
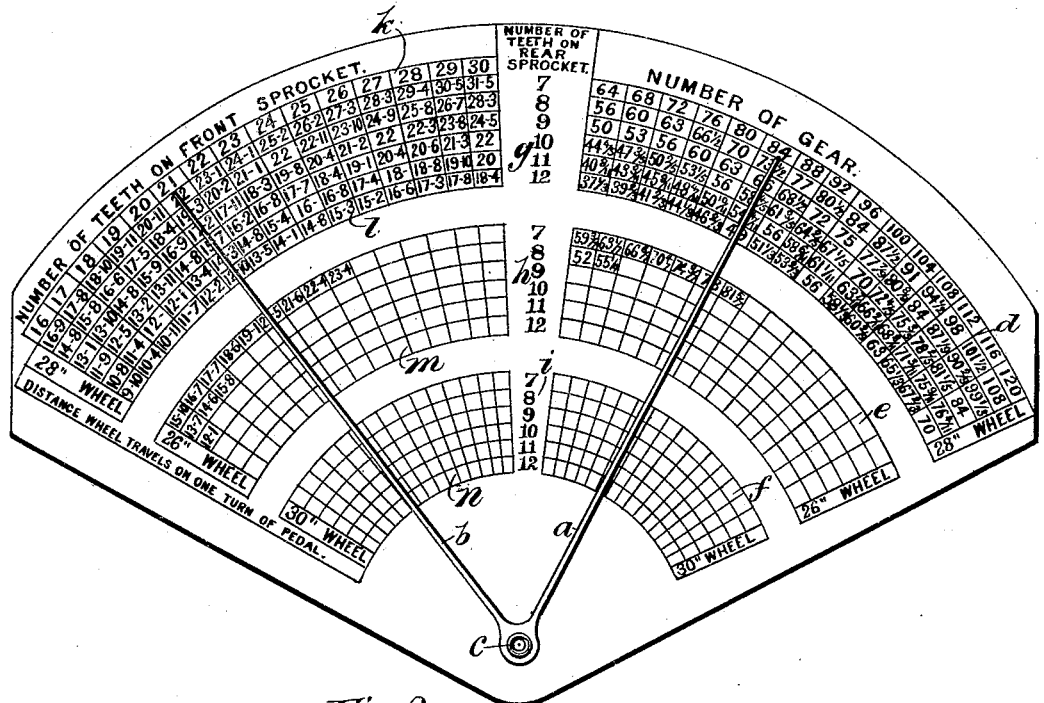
Figure 2:
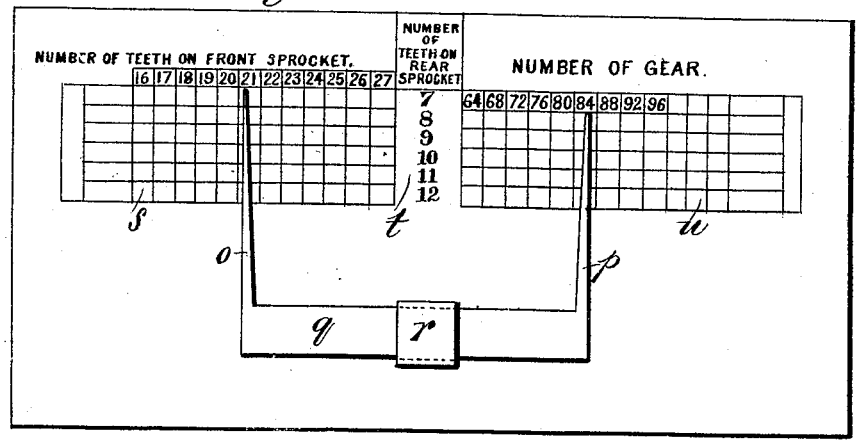
Figure 3:
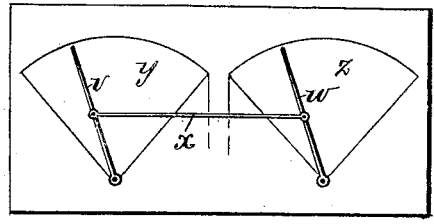

In the annexed drawings, Figure 1 represents one form of my gear-indicating device. Fig. 2 shows a modification in the form of the indicator. Fig. 3 shows another modification.

Referring first to Fig. 1, the rigidly-connected and conjointly-movable indicator-arms $a$ and $b$ are shown as radiating from a center or pivot $c$, on which they are supported in such manner as to move in unison when either arm is pushed either to the right or left.

As shown, the indicator table or tables may constitute the segment of a circle of which the pivot $c$ is the center. A preferred form of my invention for a cycle-gear indicator is that in which tables $d$, $e$, and $f$ are provided to indicate various gears for cycle driving-wheels differing in diameter—such, for instance, as the usual twenty-eight-inch, twenty-six-inch, and thirty-inch wheels. Obviously a table or tables may be calculated for a wheel or wheels of diameter differing from those here referred to. The indicator represented in Fig. 1 also shows tables or columns of figures $g$ $h$ $i$ for the number of teeth on a rear sprocket-wheel corresponding with any required gear for a driving-wheel of definite diameter—twenty-six, twenty-eight, or thirty inches, as the case may be. The indicator also comprises a line of figures or table $k$ for the number of teeth on various sizes of front sprocket-wheels. Other spaces traveled over by one of the indicator-arms may be utilized for tables $l$ $m$ $n$, showing the distance traveled by a driving-wheel of any diameter and gear included in the indicator-tables.

Fig. 1 of the drawings shows the various figures or numbers comprised in the indicator table or tables as being conveniently arranged in radial columns on arcs of circles that are concentric with the pivot $c$, on which the conjointly-movable arms $a$ $b$ are supported. The arrangement shown is not, however, essential, but may be varied according to the intended uses of the indicator and other circumstances.

To illustrate the manner of using this gear-indicator, let it be supposed that it is desired to ascertain at once and without calculation the required number of teeth on front and rear sprockets, respectively, required to give a gear of eighty to a twenty-eight-inch wheel. For this purpose the right-hand indicator-arm $a$ will be made to point to "80," which is found in the top line of table $d$, and in the same line of table $g$ is found only the numeral "7," which thus indicates the required number of teeth for the rear sprocket-wheel. At the same time the left-hand indicator-arm $b$ will point to the number "20" in table $k$, thus indicating the number of teeth required on the front sprocket. The accuracy of this indication may be proved by a simple calculation—viz., $28 \times 20 = 560$ and $560 \div 7 = 80$. The diameter of the driving-wheel in inches being multiplied by the number of teeth on the front sprocket and the product divided by the number of teeth on the rear sprocket, the quotient will represent the gear. Again, let it be supposed that it is desired to ascertain the gear of a twenty-eight-inch wheel used with a front sprocket having eighteen teeth and a rear sprocket of nine teeth. For this purpose the left-hand indicator-arm $b$ will be made to point to "18" on table $k$ and at the same time the right-hand indicator-arm $a$ will cover "56" in that line of table $d$ which coincides with the numeral "9" in table $g$, thus indicating that fifty-six is the gear of the driving-wheel, for $28 \times 18 = 504$ and $504 \div 9 = 56$. It will be understood that where the gear is expressed with strict accuracy by a fraction the nearest whole number may be marked on the indicator-table or the precise gear may be marked, as preferred.

Although in Fig. 1 I have only shown the indicator as arranged for wheels of twenty-six, twenty-eight, and thirty inches, it will be obvious that it may be restricted or extended as required to indicate the proportions for the parts of various gears for wheels of any diameter. For the sake of clearness in the drawings only some of the numbers concerned in the gears are marked in their appropriate places. It will be understood that in constructing the indicator-tables they may be marked for any diameter of driving-wheel and for any number of teeth on front and rear sprockets, respectively, with corresponding numbers to indicate the gear.

Reference to Fig. 1 will show that by means of properly-calculated tables $l$ $m$ $n$ the left-hand indicator-arm $b$ may be made to indicate the distance traveled by a driving-wheel of any diameter and gear in one revolution of the pedal. The angle formed by the radiating and conjointly-movable indicator-arms $a$ $b$, Fig. 1, must of course be such that they will respectively correspond with the radial columns of figures in the indicator-tables.

In Fig. 2 I have shown an indicator in which the conjointly-movable indicator-arms $o$ $p$ are placed parallel at a suitable distance apart and are carried by a laterally-movable slide $q$, supported in a guide $r$, in front of and below tables $s$ $t$ $u$ for respectively indicating the number of teeth on front and rear sprockets and the resulting gear of a twenty-eight-inch wheel. The parallel conjointly-movable indicator-arms $o$ $p$ are preferably arranged to project upward, as shown, though they might be extended downward if arranged above the indicator-tables $s$ $t$ $u$, in which the various indications are arranged in lines that intersect at right angles. Although I have shown this form of indicator as arranged for only a twenty-eight-inch wheel, it is obvious that the table or tables may be marked to indicate various gears for several different-sized wheels. The manner of using this form of indicator will be apparent from the preceding description, the left-hand indicator-arm $o$ being designed to show the number of teeth on a front sprocket-wheel required for use with a rear sprocket-wheel of, say, from seven to twelve teeth in order to give the gear, as indicated by the right-hand indicator-arm $p$, the number of said gear being found beneath the arm $p$ in that line of figures which coincides with the line in table $t$ marked with the required number of teeth for the rear sprocket.

In Fig. 3 I have shown another arrangement of tables or dials $y$ $z$ with two pivoted and conjointly-movable indicator-arms $v$ and $w$, connected by a cross-arm $x$, having pivotal connection with said indicator-arms.

Either form of cycle-gear indicator described herein may be conveniently applied to card calendars for cycle-advertising purposes or may be mounted in any other suitable manner.

What I claim as my invention is—

1. A cycle-gear indicator consisting of a plurality of conjointly-movable indicator-arms and a table or tables comprising figures to indicate the number of teeth on a front sprocket, the number of teeth on a rear sprocket and the resulting gear for a wheel of definite diameter, substantially as described.

2. A cycle-gear indicator, consisting of a table or tables comprising indications for the number of teeth on a front sprocket, the number of teeth on a rear sprocket, the gears for a wheel of definite diameter, and the distance traveled by such wheel for any gear at one revolution of the pedal, and a plurality of conjointly-movable indicator-arms, substantially as described.

In testimony whereof I have hereunto set my hand in presence of two subscribing witnesses.

STEPHON A. DAVIS.

Witnesses:
   JNO. COLBERT,
   ALMERIN S. COOK.